Nov. 20, 1951 J. SUMMERS 2,575,641
CONE GRIP LOCK NUT
Filed Oct. 2, 1947
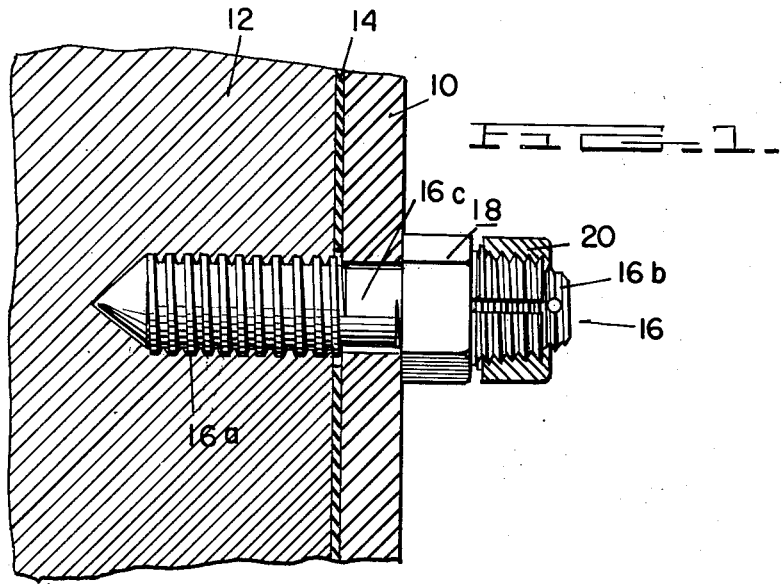
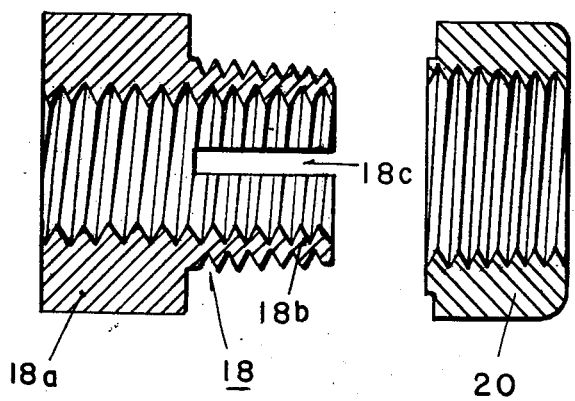
Inventor
John Summers
By [signature]
Attorneys Patented Nov. 20, 1951

2,575,641

UNITED STATES PATENT OFFICE 2,575,641

CONE GRIP LOCK NUT

John Summers, Chillicothe, Ohio

Application October 2, 1947, Serial No. 777,524

6 Claims. (Cl. 151—19)

This invention relates to improvements in cone grip lock nut especially designed and adapted for use under abnormally high temperature and excessive vibration conditions to which such assemblies are exposed in aircraft engines, for example, and to an improved stud locking nut for use therewith.

One typical application of the stud and nut assembly of this invention is in connection with the mounting of exhaust collector rings or manifolds on the cylinders of aircraft engines, the flanges thereof being held to the engine cylinder by means of studs threaded into the cylinder wall and holding nuts assembled on the studs. Present-type stud nuts tend to work loose under the abnormal temperature and vibratory conditions to which they are exposed in this type of installation, permitting vibrations to be set up in the collector ring and tending to cause early failure of the stud. When these undesirable conditions arise a variety of dangerous results may follow. For example, the collector ring gasket may be blown out, the collector ring may be fractured due to uncontrolled vibration set up therein, a dangerous fire hazard is created due to flames leaking by the loosened or fractured exhaust ring flange, and engine repair and maintenance problems are multiplied as well.

Accordingly a main object of the invention is the provision of a stud and nut assembly especially adapted for, but not limited to, use in securing the flange of an exhaust collecting ring or manifold to the cylinder of an aircraft engine, which is so constructed and designed as to substantially completely eliminate the possibility of the flange stud nuts coming loose from their studs.

Another object of the invention is the provision of an improved stud and nut assembly as specified, wherein the holding and seizing properties of nut to stud increases with increase in temperature. A further object of the invention is the provision of an improved locking nut for the studs by which parts subject to excessive vibration and abnormally high temperatures are secured together, which is characterized by simple construction, ease in application, and by a holding power which increases with high temperature, thereby to resist any tendency to work loose from its stud under the abnormal conditions of use to which it is exposed.

Other objects and advantages of the invention will be apparent from the following detailed description thereof, taken with the accompanying drawing, in which—

Fig. 1 is a part sectional view of an improved stud and nut assembly according to the invention mounted in a typical installation;

Fig. 2 is a longitudinal section taken through the holding nut of the assembly illustrated in Fig. 1; and Fig. 3 is a longitudinal section taken through the locking nut of the Fig. 1 assembly.

Referring to the drawings in which like reference numerals designate like parts throughout the several views, the stud and nut assembly of this invention is illustratively shown in its mounted position in which it secures a part 10, such as the flange of an exhaust collecting ring or manifold, to another part 12, which may be the cylinder block of an aircraft engine. As is usual, a sealing gasket 14 is interposed between flange and cylinder block.

As shown, the stud and nut assembly comprises a flange mounting stud 16, a prime or holding nut 18, and a locking nut 20. The stud 16 may have a large diameter inner end 16a which is threaded so as to screw into the cylinder wall, and a smaller diameter outer end 16b which is threaded to receive the holding nut 18, to be described in detail. The threads formed on the outer end of the stud terminate short of the threads on the inner end thereof, whereby to provide an intermediate unthreaded stud portion 16c on which the flange 10 is disposed.

The aforementioned holding nut 18 comprises a "hex" head portion 18a whereby it may be turned on the outer end of the stud by a wrench or the like and a smaller diameter shank portion 18b. Said head and shank portion are provided with a uniform diameter bore which is interiorly threaded for its full length so as to screw on to the outer threaded end 16b of the stud. As seen in Fig. 2, the shank portion 18b is provided with at least one axial slot 18c cut through the wall thereof, and preferably two such oppositely disposed slots are provided. As is well known, the slotting of the shank portion has the effect of weakening it under radial compression. The shank portion is externally tapered so as to have smaller diameter at its outer than at its inner or head end and is also externally threaded as shown with a tapered pipe thread.

The aforesaid lock nut 20 is adapted to be threaded on to the externally tapered and threaded shank portion 18b, and to this end is formed with a tapered bore provided with inside tapered pipe threads corresponding to the external threads of the holding nut shank portion. Thus, it will be apparent that screwing of the locking nut onto the threaded shank portion will result in a reduction of the internal diameter of the shank, and with the holding nut screwed down tight against the exhaust ring flange 10, that such reduction in diameter of the shank will cause its internal threads to seize against the threads of the stud thereby to exercise a firm holding and locking action of holding nut on stud.

According to a further feature of the invention, the stud 16 and the locking nut 20 are machined from metal having the same or substantially equal co-efficients of expansion, whereas the holding nut 18 is formed of metal having a higher co-efficient of expansion than that of stud and locking nut. For example, the stud and locking nut may be formed of steel while the holding nut is made of a more ductile metal such as brass having a higher co-efficient of expansion than steel. With such a selection of metals, it will be seen that when the parts are assembled as shown in Fig. 1 and subjected to the abnormally high temperatures such as would be encountered in an exhaust collector ring installation, the stresses introduced by the different expansion characteristics of holding nut to stud and locking nut will result in a further seizing of the holding nut threads on stud threads. This added seizing action of course increases with the higher temperatures. Thus it becomes apparent that the danger of the holding nut working loose from the stud under the abnormally high temperatures encountered in aircraft engines is substantially completely eliminated, due to the fact that such high temperatures enhance the holding action of the holding nut. On the other hand, the parts may be readily disassembled at ordinary temperatures, the arrangement thereof making for positive non-freezing and re-use.

From the foregoing, it will be appreciated that I have provided a stud and nut assembly having special utility in securing together mechanical or structural parts which are exposed to abnormally high temperatures, and more particularly for securing an exhaust collector ring to the cylinder of an external combustion engine wherein such an assembly is exposed to abnormally high temperatures and excessive vibration conditions.

As many changes could be made in carrying out the above construction without departing from the scope of the invention, it is intended that all matter contained in the above description or shown in the accompanying drawing shall be interpreted as illustrative and not in a limiting sense.

I claim:

1. In a stud and nut assembly for use in securing together machine or structural parts exposed to high temperatures, the combination of a stud bolt, an internally threaded holding nut having a slotted, externally tapered and threaded shank portion, and a locking nut having a bore tapered and threaded to correspond to the taper and threading of the shank portion, the holding nut being threaded on to the stud bolt and said locking nut being threaded on to the shank portion of the holding nut, said stud bolt and locking nut being made from a hard metal and said holding nut being made from a more ductile metal having a higher coefficient of expansion than said hard metal.

2. In a stud and nut assembly for use in securing together machine or structural parts exposed to high temperatures, the combination of a stud bolt, an internally threaded holding nut having a slotted, externally tapered and threaded shank portion, and a locking nut having a bore tapered and threaded to correspond to the taper and threading of the shank portion, the holding nut being threaded on to the stud bolt and said locking nut being threaded on to the shank portion of the holding nut, said stud bolt and locking nut being each made from a metal having substantially the same co-efficient of expansion, and the holding nut being made from a dissimilar metal having a higher coefficient of expansion.

3. In a stud and nut assembly for use in securing together machine or structural parts exposed to high temperatures, the combination of a stud bolt, an internally threaded holding nut having a slotted, externally tapered and threaded shank portion, and a locking nut having a bore tapered and threaded to correspond to the taper and threading of the shank portion, the holding nut being threaded on to the stud bolt and said locking nut being threaded on to the shank portion of the holding nut, said stud bolt and locking nut being made from steel and said holding nut being made from brass.

4. In an exhaust flange stud locking nut assembly, an internally threaded holding nut having head and shank portions, the shank portion having a weakening slot cut through its wall and being externally tapered and threaded, and a locking nut whose bore is tapered and threaded to correspond to the taper and threading of the shank portion and being adapted for threading onto said threaded shank portion, said holding nut being constructed from a metal having a higher coefficient of expansion than the metal of the locking nut whereby the seizing power of the holding nut increases with increase of the temperature to which the assembly is exposed.

5. In an exhaust flange stud locking nut assembly, an internally threaded holding nut having head and shank portions, the shank portion having a weakening slot cut through its wall and being externally tapered and threaded, and a locking nut whose bore is tapered and threaded to correspond to the taper and threading of the shank portion and being adapted for threading onto said threaded shank portion, said holding nut being constructed from a metal having a higher coefficient of expansion than the metal from which said locking nut is constructed, whereby the seizing power of the holding nut increases with increase of the temperature to which the assembly is exposed.

6. In an exhaust flange stud locking nut assembly, an internally threaded holding nut having head and shank portions, the shank portion having a weakening slot cut through its wall and being externally tapered and threaded, and a locking nut whose bore is tapered and threaded to correspond to the taper and threading of the shank portion and being adapted for threading onto said threaded shank portion, said holding nut being made from brass and the locking nut being made from steel, whereby the seizing power of the holding nut increases with increase of the temperature to which the assembly is exposed.

JOHN SUMMERS.

REFERENCES CITED

The following references are of record in the file of this patent:

UNITED STATES PATENTS

| Number | Name | Date |
| --- | --- | --- |
| 181,589 | Naylor | Aug. 29, 1876 |
| 204,036 | Harvey | May 21, 1878 |
| 652,789 | Leitelt | July 3, 1900 |
| 898,432 | Boyle | Sept. 15, 1908 |
| 1,357,331 | Le Fauve | Nov. 2, 1920 |

FOREIGN PATENTS

| Number | Country | Date |
| --- | --- | --- |
| 19,636 | Great Britain | Oct. 2, 1901 |
| 167,228 | Great Britain | Apr. 26, 1920 |